US012227978B2

(12) United States Patent
Bartsch et al.

(10) Patent No.: US 12,227,978 B2
(45) Date of Patent: Feb. 18, 2025

(54) METHOD AND SYSTEM FOR CONTACTLESS OBSTACLE DETECTION FOR A MOTOR VEHICLE HAVING A FRONT SIDE DOOR AND A REAR SIDE DOOR

(71) Applicant: Stabilus GmbH, Koblenz (DE)

(72) Inventors: Tim Bartsch, Koblenz (DE); Markus Link, Koblenz (DE); Willibald Reitmeier, Regensburg (DE); Philippe Grass, Regensburg (DE)

(73) Assignee: Stabilus GmbH, Koblenz (DE)

( * ) Notice: Subject to any disclaimer, the term of this patent is extended or adjusted under 35 U.S.C. 154(b) by 77 days.

(21) Appl. No.: 17/988,941

(22) Filed: Nov. 17, 2022

(65) Prior Publication Data

US 2023/0151666 A1 May 18, 2023

(30) Foreign Application Priority Data

Nov. 18, 2021 (DE) ........................ 102021130106.8

(51) Int. Cl.
*E05F 15/43* (2015.01)

(52) U.S. Cl.
CPC ......... *E05F 15/43* (2015.01); *E05Y 2900/531* (2013.01)

(58) Field of Classification Search
CPC ........................... E05F 15/43; E05Y 2900/531
See application file for complete search history.

(56) References Cited

U.S. PATENT DOCUMENTS 7,528,704 B2 * 5/2009 Das ........................ B60R 21/013 340/436
9,797,181 B2 * 10/2017 Wheeler ............ G07C 9/00944
10,358,857 B2 * 7/2019 Wheeler ............ G07C 9/00944
10,968,667 B2 * 4/2021 Nottebaum ........... E05C 17/203
11,530,568 B2 * 12/2022 Battlogg ................ B60N 2/002
11,603,698 B2 * 3/2023 Battlogg ................. E05F 15/41
(Continued)

FOREIGN PATENT DOCUMENTS

DE 102015214693 A1 2/2017
DE 102017110334 A1 11/2018
(Continued)

OTHER PUBLICATIONS

Search report issued by the German Patent and Trademark Office on Jul. 18, 2022 for Application No. 10 2021 130 106.8, Germany.

*Primary Examiner* — Hoi C Lau
(74) *Attorney, Agent, or Firm* — Locke Lord LLP; Tim Tingkang Xia, Esq.

(57) ABSTRACT

A method and a system for contactless obstacle detection for a motor vehicle having a front side door and a rear side door, using a single primary obstacle sensor provided on the motor vehicle, preferably in the form of a ToF sensor, which is configured to monitor an opening region of the front side door, and, at least as long as the front side door is closed, also to monitor an opening region of the rear side door, the method comprising the following step, which is carried out repeatedly: determining a current maximum allowed opening angle for the rear side door based on an output of a monitoring of the opening region of the rear side door by the primary obstacle sensor and taking into account a current opening state of the front side door.

11 Claims, 4 Drawing Sheets

(56) References Cited

U.S. PATENT DOCUMENTS

| | | | | |
|---|---|---|---|---|
| 11,634,939 | B2 * | 4/2023 | Battlogg | E05F 15/76<br>701/49 |
| 11,702,879 | B2 * | 7/2023 | Battlogg | B60Q 9/00<br>49/31 |
| 11,873,671 | B2 * | 1/2024 | Battlogg | E05F 15/611 |
| 2017/0234054 | A1 * | 8/2017 | Kumar | E05F 15/73<br>49/324 |
| 2017/0247932 | A1 * | 8/2017 | Partsch | B60J 5/0477 |
| 2018/0038148 | A1 * | 2/2018 | Wheeler | E05F 15/77 |
| 2019/0316393 | A1 * | 10/2019 | Huang | E05F 15/42 |
| 2023/0151666 | A1 * | 5/2023 | Bartsch | E05F 15/43<br>340/435 |
| 2024/0093545 | A1 * | 3/2024 | Kojima | E05F 15/73 |

FOREIGN PATENT DOCUMENTS

| | | | |
|---|---|---|---|
| WO | 2004071815 | A1 | 8/2004 |
| WO | 2005044639 | A1 | 5/2005 |
| WO | 2017137030 | A9 | 8/2017 |

* cited by examiner

METHOD AND SYSTEM FOR CONTACTLESS OBSTACLE DETECTION FOR A MOTOR VEHICLE HAVING A FRONT SIDE DOOR AND A REAR SIDE DOOR

CROSS-REFERENCE TO RELATED APPLICATION

This application claims priority to German Patent Application No. DE 10 2021 130 106.8, filed Nov. 18, 2021, which is hereby incorporated herein in its entirety by reference.

FIELD OF THE INVENTION

The present invention relates to a method and to a system for contactless obstacle detection for a motor vehicle having a front side door and a rear side door on one side of the vehicle.

BACKGROUND OF THE INVENTION

In motor vehicles with automatically driven side doors in particular, it is necessary to monitor the region in which the doors open, in a contactless manner, in order to avoid collisions with any obstacles.

Approaching objects such as cyclists can be recognised quite well by existing driver assistance systems. However, there are currently gaps, especially for static and slow-moving objects in the direct opening region or pivot region of the door.

Substantially three types of sensors for monitoring the opening region of a vehicle side door are known from the prior art: ultrasonic sensors, radar sensors, and time-of-flight sensors that work with a transit time method and are referred to here as ToF sensors.

Ultrasonic sensors and radar sensors are comparatively cheaper than ToF sensors, but they provide less precise measurements at close range (<20 cm), and can only map complex obstacles such as a bicycle very imprecisely—often only with a few points of a point cloud.

In comparison, ToF sensors provide more accurate measurements both at close range and for complex obstacles, but are relatively expensive, cannot be installed completely invisibly, and are vulnerable to contamination. The dependence of the monitoring quality on weather conditions is also the greatest for ToF sensors among the methods mentioned. Since ToF systems work with visible or IR light, the quality of the monitoring can also depend on the colour and surface texture of the obstacles.

SUMMARY OF THE INVENTION

In light of this background, the object of the present invention is to provide a method and a system for contactless obstacle detection that is improved with respect to a compromise between the criteria of cost and reliability.

This object is achieved by a method and a system as described in the independent claims. The dependent claims describe advantageous embodiment variants of the invention.

In the method according to the invention, the contactless obstacle detection for a motor vehicle having a front and a rear side door is carried out using a single primary obstacle sensor provided on the motor vehicle for the respective vehicle side, which sensor is configured to monitor an opening region of the front side door, and, at least as long as the front side door is closed, also to monitor an opening region of the rear side door. The primary obstacle sensor is preferably a ToF sensor that works, for example, with light in the visible and/or infrared range, and monitors the associated opening regions with a transit-time method. In principle, however, it is also possible to use another type of sensor that is able to monitor the opening region of both side doors, as long as they are closed.

The term “monitoring” is to be understood in the sense of detecting an object or obstacle in the monitored area.

The method according to the invention comprises the following step, which is carried out repeatedly, preferably at regular time intervals: determining a current maximum allowable opening angle for the rear side door based on an output of the primary obstacle sensor monitoring the opening region of the rear side door, and taking a current opening state of the front side door into account.

As long as both doors are closed, the primary obstacle sensor can monitor the opening region of both side doors, and communicate the output, for example, to control software for the door drive of both doors.

The output of the monitoring of an opening region can comprise the image recorded by the given sensor, the positions of obstacles detected in the opening region determined therefrom, and/or the maximum opening angle determined on the basis of the monitoring for the side door in question—or simply the message that there are no obstacles present in the opening region.

By using a single primary obstacle sensor, in particular a ToF sensor, for both side doors of one side of the vehicle, the costs for the entire system can be reduced. For this purpose, the primary obstacle sensor can also be integrated, for example, in the side mirror, the hinge of the front side door, or the front fender, which is advantageous both in terms of preventing contamination and from a design point of view.

The reliability of obstacle detection in the opening region of the rear side door if the front side door is open, i.e., if the field of view of the primary obstacle sensor is covered by the front side door, for example, or was pivoted together with the front side door, can be ensured or increased in various ways are described in more detail below.

According to a preferred embodiment of the invention, when the front side door is currently sufficiently closed, the current maximum allowed opening angle for the rear side door is determined based on the output of a current monitoring of the opening region of the rear side door by the primary obstacle sensor.

The term “sufficiently closed” can be understood in such a way that the opening angle of the front side door does not exceed a predetermined maximum angle. In extreme cases, however, the front side door can be considered “sufficiently closed” only if it is completely closed.

In this embodiment, when the front side door is currently not sufficiently closed, the maximum allowable opening angle for the rear side door is determined based on the output of previous monitoring of the opening region of the rear side door by the primary obstacle sensor, given that the front side door was sufficiently closed during the previous monitoring, in particular was sufficiently closed the last time.

For this purpose, it can be provided that when the front side door is currently sufficiently closed, the output of the current monitoring of the opening region of the rear side door by the primary obstacle sensor is filed and stored in a memory unit. This stored value can be continuously overwritten as long as the front side door is sufficiently closed. As soon as the front side door is opened, the last stored monitoring output for the rear side door can be accessed.

According to an embodiment variant that is particularly simple in terms of apparatus, it can be provided that the maximum allowed opening angle for the rear side door which was determined and optionally stored the last time the method was carried out when the front side door was sufficiently closed, is used as the current maximum allowed opening angle as long as the front side door is open, such that only a single sensor is required—i.e., the primary obstacle sensor which monitors the opening regions of both doors.

However, it is preferably provided that, at least when the front side door is not sufficiently closed, the current maximum allowed opening angle for the rear side door is also determined on the basis of an output of a current monitoring of the opening region of the rear side door by an additional obstacle sensor, wherein the additional sensor preferably belongs to a different sensor type than the primary obstacle sensor—that is to say, it works in particular according to a different detection principle, and is particularly preferably not a ToF sensor. In addition, the additional obstacle sensor in this embodiment is designed to monitor the opening region of the rear side door independently of the opening state of the front side door.

This additional obstacle sensor can be installed in the region of the rear door, and monitors the opening region of this door. For example, an ultrasonic sensor mounted behind sheet metal, or a radar sensor mounted behind plastic, can be used as an additional sensor. The primary function of this additional sensor, which is more cost-effective compared for example to a ToF sensor, is the detection of newly appearing obstacles in the opening region of the rear side door since the front door was opened. In general, regardless of the sensor type, the additional obstacle sensor is preferably a more cost-effective and/or less powerful sensor than the primary obstacle sensor.

A standard situation that can be handled well in this way is one in which a person exits the front side door and enters the opening region of the rear side door. Such a person can also be detected with sufficient accuracy by a less precise sensor, such as an ultrasonic or radar sensor.

For example, it can be provided that the stored maximum allowed opening angle which was determined during the last monitoring of the opening region of the rear side door with the primary obstacle sensor when the front side door was still closed is compared with the maximum allowed opening angle, which is based on the current monitoring of the opening region of the rear side door with the additional sensor, and the smaller of the two values is then sent to the door drive of the rear side door in order to limit the opening angle in the event of automatic door opening.

More complex obstacles, such as a parked bicycle, a high curb, or a bollard, were already detected by the ToF sensor before the front side door was opened, and will continue to be taken into account when determining the current maximum allowed opening angle for the rear side door. Since such obstacles are usually immovable, detection by the additional sensor is not absolutely necessary.

A kind of fusion of the monitoring outputs from the primary obstacle sensor and the additional obstacle sensor therefore takes place.

In principle, it can be provided that the additional obstacle sensor is only accessed or used when the front side door is not sufficiently closed.

In order to increase the reliability of the obstacle detection, however, it is preferably provided that the opening region of the rear side door should also be monitored with the additional obstacle sensor in other situations, and both the outputs of the primary obstacle sensor and the outputs of the additional obstacle sensor are taken into account in the determination of the current maximum allowed opening angle for the rear side door.

In particular, possible weaknesses of the individual sensor types can be compensated for in this way, for example by taking into account the additional sensor, for example in the form of a radar or ultrasonic sensor, for the determination of the current maximum allowed opening angle for the rear side door in unfavourable weather conditions, regardless of the opening state of the front side door, in addition to the ToF sensor as the primary obstacle sensor, which is highly affected by weather conditions.

Finally, it can also be provided that, when determining the current maximum allowed opening angle for the rear side door, both the primary obstacle sensor and the additional obstacle sensor are always taken into account, wherein the additional sensor can compensate for weaknesses in the primary obstacle sensor, for example in terms of colour and surface texture, and alignment of the obstacle.

Of course, provision can also be made to determine a current maximum allowed opening angle for the front side door based on an output of a current monitoring of the opening region of the front side door by the primary obstacle sensor, optionally supplemented by the output of a current monitoring of the opening region of the front side door by an additional sensor, which preferably belongs to another, in particular more cost-effective, sensor type, and is particularly preferably not a ToF sensor.

Furthermore, protection is also sought for a method for automatically opening doors in a motor vehicle having a front and a rear side door, the method comprising the following steps: carrying out the method according to the invention for contactless obstacle detection as described above, and then, when a user initiates the opening of the rear side door, for example by operating the door handle or a remote control, automatically opening the rear side door, such that the specific current maximum allowed opening angle for the rear side door and, if applicable, for the front side door is not exceeded.

The system according to the invention for contactless obstacle detection for a motor vehicle having a front and a rear side door comprises: a front door sensor which is designed to detect an opening state of the front side door, a primary obstacle sensor which is provided on the motor vehicle and is configured to monitor an opening region of the front side door and, at least as long as the front side door is closed, also to monitor an opening region of the rear side door, a data processing unit which is in communication with the front door sensor and the primary obstacle sensor, and which is configured to determine a current maximum allowed opening angle for the rear side door based on an output of a monitoring of the opening region of the rear side door by the primary obstacle sensor, taking into account a current opening state of the front side door, and a door drive for the rear side door, which is in communication with the data processing unit. The primary obstacle sensor is preferably a ToF sensor.

In particular, the system can be configured to carry out the method according to the invention for contactless obstacle detection or for automatic door opening, as has been described above or is described in one of the method claims.

The system may comprise a memory unit in which the output of the current monitoring of the opening region of the rear side door by the primary obstacle sensor is stored if the front side door is currently sufficiently closed, and from which the output of the previous monitoring can be retrieved if the front side door is currently not sufficiently closed. This memory unit can be integrated, for example, in the primary obstacle sensor or in the data processing unit, or it can be provided as a separate assembly. Generally, unless otherwise specified, the term "unit" is used herein to mean simply a functional unit, and does not necessarily imply that the unit is spatially separated from other components of the system.

The primary obstacle sensor is expediently provided on a side mirror, on a hinge of the front side door, or on a front fender of the motor vehicle. With a sufficiently large viewing angle or a sufficiently wide image range of this sensor, it can be ensured that it adequately monitors both the opening region of the front side door and the opening region of the rear side door, at least as long as both side doors are closed.

As explained above in connection with the method, the system preferably further comprises an additional obstacle sensor, which preferably belongs to a different sensor type than the primary obstacle sensor and more preferably is not a ToF sensor, and which is further configured to at least monitor the opening region of the rear side door—specifically, regardless of the opening state of the front side door.

This additional obstacle sensor is preferably a radar or ultrasonic sensor, especially if the primary obstacle sensor is a ToF sensor.

Alternatively or additionally, the additional obstacle sensor is provided in such a way that it monitors both the opening state of the rear side door and the opening region of the front side door. For this purpose, the additional sensor is expediently provided, for example, in the region of the B-pillar of the motor vehicle.

Protection is also sought for a motor vehicle having the system described above, which can be provided in particular for both sides of the vehicle, such that a single primary obstacle sensor is provided on each side of the vehicle, which monitors the associated front and rear side doors as long as the two side doors are closed. An associated additional obstacle sensor is preferably also provided for each rear side door, which preferably works according to a different detection principle than the primary obstacle sensor, and particularly preferably is not a ToF sensor and is therefore more cost-effective.

BRIEF DESCRIPTION OF THE DRAWINGS

The principle of the present invention is illustrated below with the aid of a few embodiments which are illustrated in the appended figures.

All of the drawings are highly simplified and schematic illustrations that primarily serve to explain the basic principle of the present invention. Rather than each feature, primarily only the features that are required to explain the particular figure are provided with reference symbols in the figures.

DETAILED DESCRIPTION OF THE INVENTION

Figure 1:
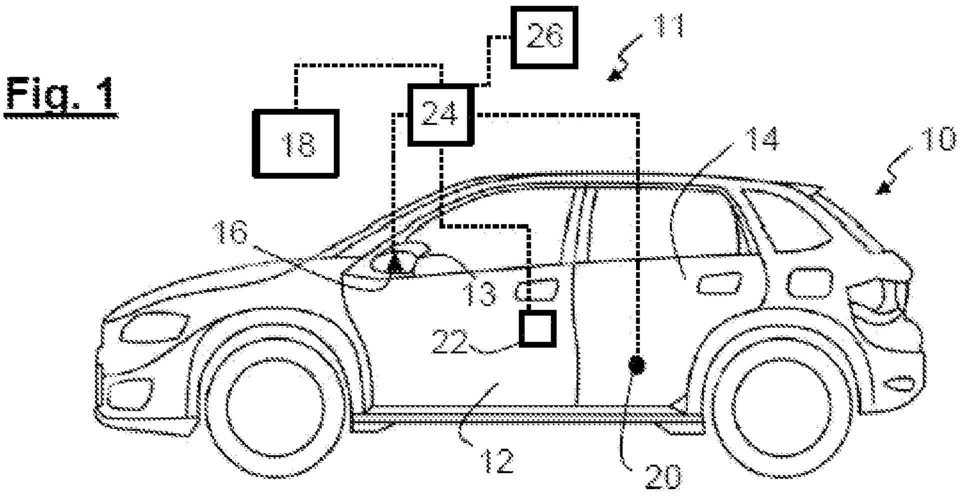
FIG. 1 is a schematic illustration of a motor vehicle according to an embodiment of the invention, in a side view.
Figure 2:
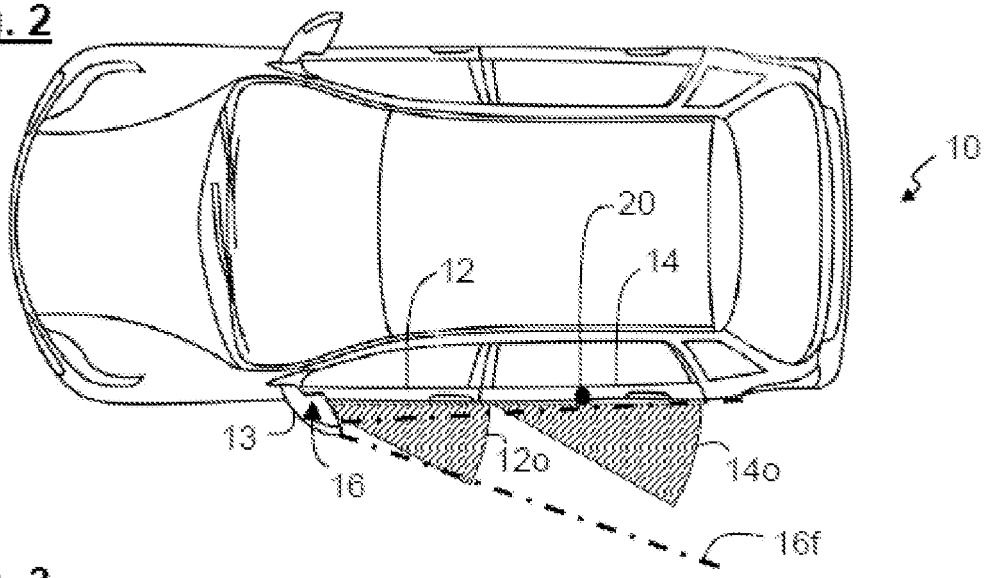
FIG. 2 is a plan view of the object of FIG. 1, in which the field of view of the primary obstacle sensor is shown in addition to the opening regions of the side doors.

The motor vehicle 10 shown schematically in FIG. 1 comprises a front side door 12 and a rear side door 14. On the side mirror 13 of the front side door is a primary obstacle sensor 16—in this case, for example, in the form of a ToF sensor, which is symbolically represented in the figures by a black triangle, and whose field of view 16*f* in FIG. 2 is indicated by dot-dash boundary lines. The position, alignment and viewing angle of the primary obstacle sensor 16 are selected so that it monitors both the opening region 12*o* of the front side door 12 and the opening region 14*o* of the rear side door 14, at least as long as both side doors 12, 14 are closed.

Figure 3:
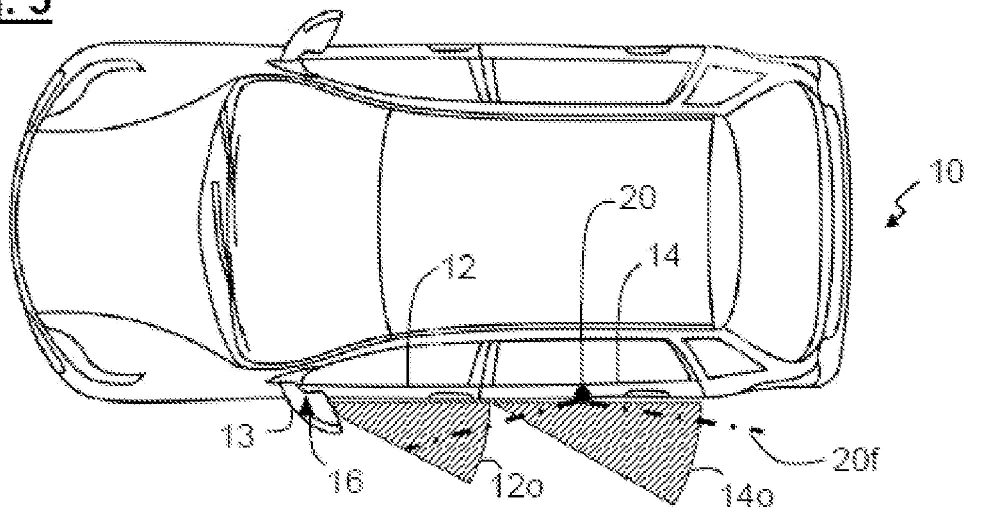
FIG. 3 is a plan view of the object of FIG. 1, in which the field of view of the additional obstacle sensor is shown in addition to the opening regions of the side doors.

The motor vehicle 10 can also comprise another, less expensive obstacle sensor 20, for example in the form of a radar or ultrasonic sensor, which is provided, for example, in the region of the rear side door 14 in such a manner that its field of vision 20*f* at least largely covers at least the opening region 14*o* of the rear side door 14, as shown in FIG. 3.

The opening state of the front side door 12 is detected by a front door sensor 22 which, like the primary obstacle sensor 16 and the additional obstacle sensor 20, is in communication—indicated by dotted lines—with a data processing unit 24 shown as a block. The data processing unit 24 is also connected to a memory unit 18 and to a door drive 26 for the two side doors, which door drive can control an automated door opening of the side doors, or at least the rear side door 14.

The data processing unit 24 serves to repeatedly determine a current maximum allowed opening angle $\alpha_{max}$ for the rear side door and a current maximum allowed opening angle $\beta_{max}$ for the front side door, on the basis of the measurement outputs of the sensors 16, 20 and 22 (cf. FIG. 4), and to communicate this to the door drive 26 to prevent a collision with obstacles.

Figure 4:
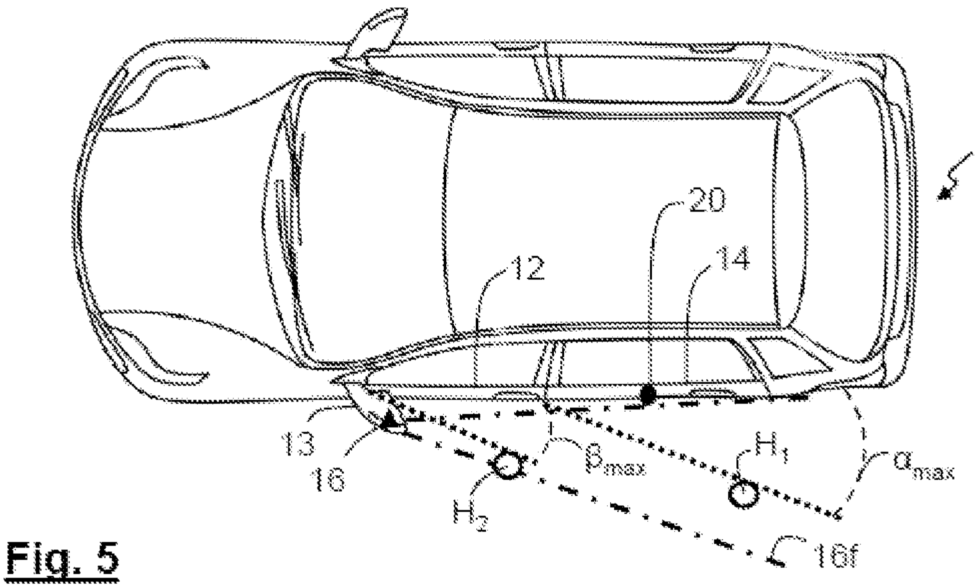
FIG. 4 is a plan view of the object of FIG. 1, to illustrate the obstacle detection when the side doors are closed.

FIG. 4 illustrates a situation in which both side doors 12, 14 are closed, with an obstacle $H_1$ such as a bollard in the opening region of the rear side door 14, and a further obstacle $H_2$ in the opening region of the front side door 12. The current maximum opening angles $\alpha_{max}$ and $\beta_{max}$ determined on the basis of the outputs of the monitoring by the primary obstacle sensor 16 are indicated in the figure by dashed lines.

Figure 5:
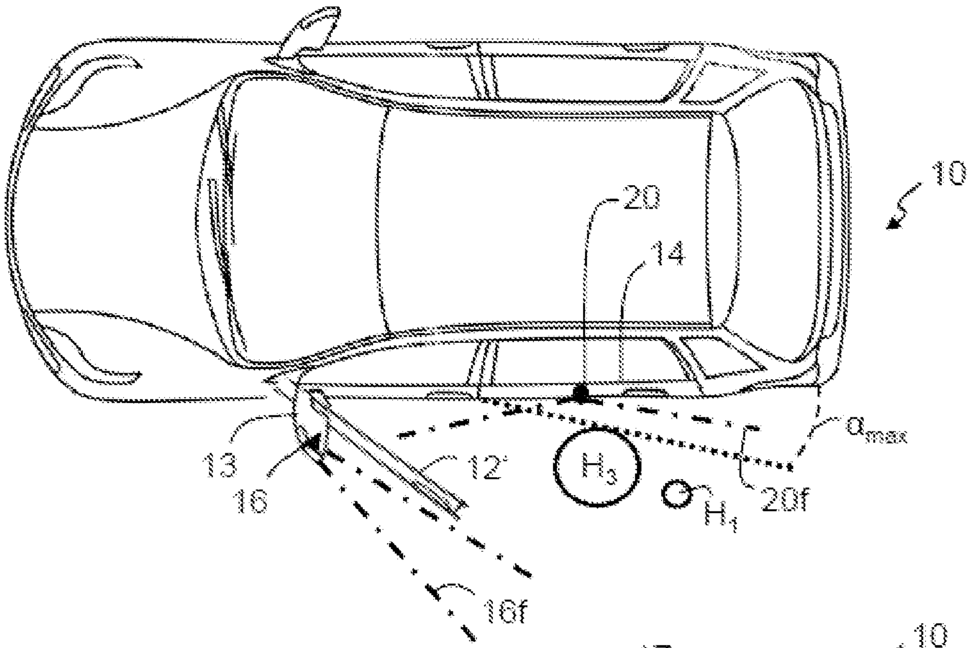
FIG. 5 is a plan view of the object of FIG. 1, to illustrate the obstacle detection when the front side door is open.

However, if the front side door 12 is opened, as shown in simplified form in FIG. 5, the field of view 16*f* of the primary obstacle sensor 16 provided on the side mirror 13 is also pivoted with the open side door 12', such that it no longer covers the opening region of the rear side door 14.

The position of the obstacle $H_1$ previously determined with the front side door 12 closed using the primary obstacle sensor 16, and/or the previous maximum opening angle determined on the basis thereof, were stored and are still taken into account when the rear side door 14 is opened automatically, especially since many of the obstacles detected in this way such as curbs, bollards, or street signs are stationary.

In this situation, however, a further obstacle $H_3$ may appear in the opening region 14o of the rear side door 14, especially if a person gets out of the opened front side door 12 and enters the opening region 14o of the rear side door 14.

However, this obstacle $H_3$ is detected by the additional obstacle sensor 20, such that the current maximum opening angle $\alpha_{max}$ can be reduced, as shown, if necessary, taking into account the output of the current monitoring by the sensor 20, in order to prevent a collision with the additional obstacle $H_3$.

A less expensive sensor is sufficient for this—for example, an ultrasonic or radar sensor—which can be installed inconspicuously in the rear side door 14.

In order to compensate for the weaknesses of the various sensor types, provision can also be made for the outputs of both sensors 16 and 20 to be used to limit an automatic opening of the rear side door 14, even when the front door 12 is closed.

Figure 6:
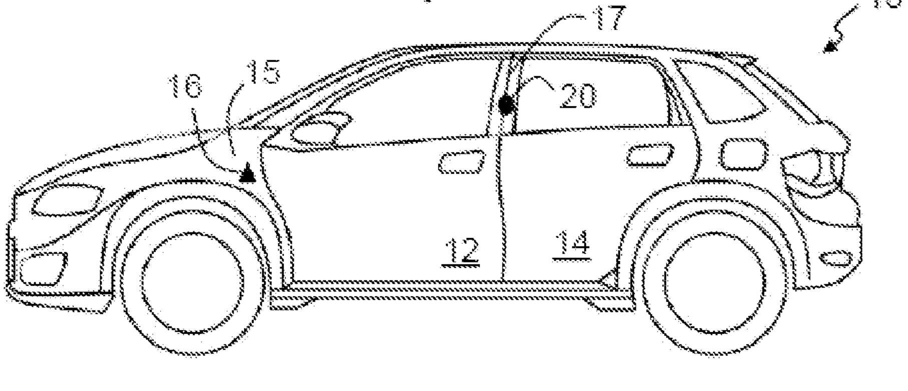
FIG. 6 is a schematic illustration of a motor vehicle according to a further embodiment of the invention in a side view.

FIG. 6 illustrates other mounting options for the sensors. For example, the primary obstacle sensor can be provided in the region of the front fender 15, and the additional obstacle sensor 20 in the region of the B-pillar 17. In particular, the additional obstacle sensor 20 can be configured and mounted in such a way that it monitors both the opening region 12o of the front side door 12 and the opening region 14o of the rear side door 14. Of course, any combination of the mounting options shown in FIGS. 1 and 6 for the two sensors 16, 20 is possible. A separate additional obstacle sensor can also be provided both for the rear side door and for the front side door.

Of course, the system described is usually provided for both sides of the vehicle, with exactly one primary obstacle sensor and, if desired, one or two additional obstacle sensors being present for each side of the vehicle.

Figure 7:
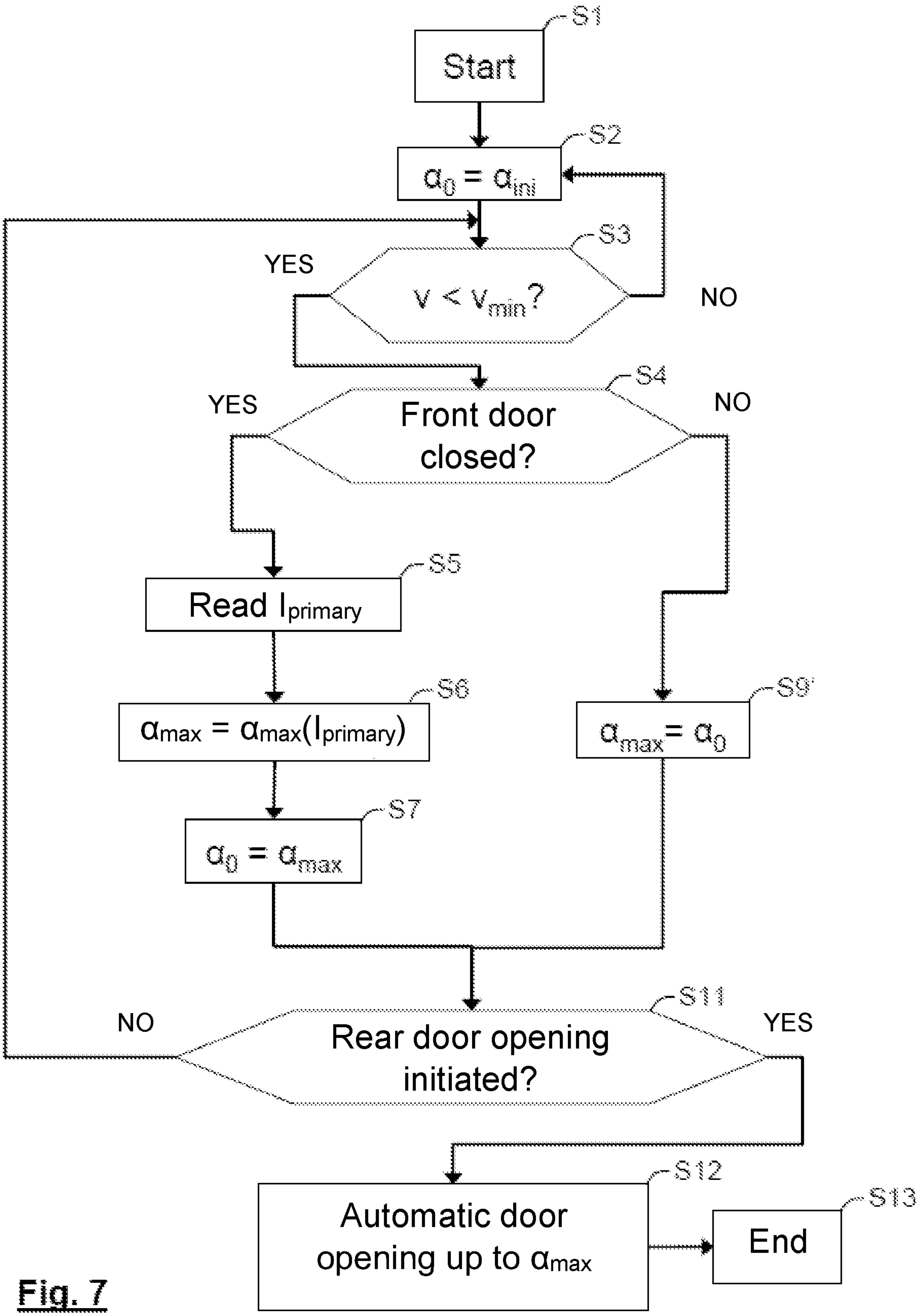
FIG. 7 is a flowchart of a method for contactless obstacle detection and automatic door opening according to an embodiment of the invention.
Figure 8:
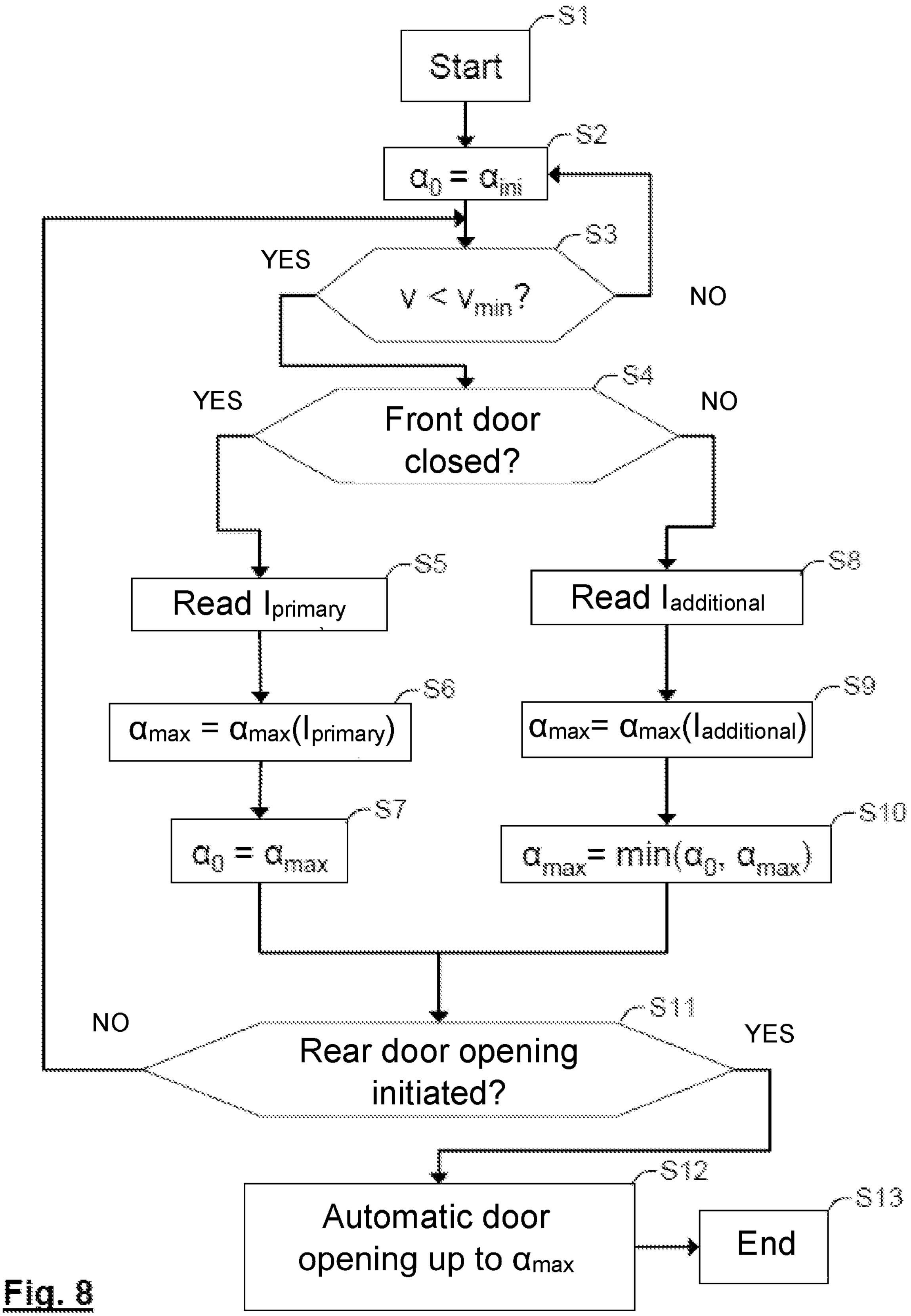
FIG. 8 is a flowchart of a method for contactless obstacle detection and automatic door opening according to a further embodiment of the invention.

FIGS. 7 and 8 illustrate two very simple design variants for a method according to the invention for contactless obstacle detection.

As shown in FIG. 7, the method is started in a step S1, and, in a subsequent step S2, a memory value $\alpha_0$ for the current maximum opening angle of the rear side door is set to a suitable initial value $\alpha_{ini}$, for example zero.

Then, in a step S3, it is determined whether a driving speed v of the motor vehicle is lower than a predefined threshold value $v_{min}$, such that a door can be expected to open.

If this is the case, then in a step S4 it is determined whether the front side door of the motor vehicle is closed or at least sufficiently closed; otherwise, the method returns to step S2.

If the front side door is closed, a current monitoring output or image $I_{primary}$ is read out by the primary obstacle sensor (ToF sensor) 16 in a step S5, and a current maximum allowed opening angle $\alpha_{max}$ for the rear side door, based on this current monitoring output, is determined in a step S6. The value $\alpha_{max}$ determined in this way is stored in step S7.

However, if the front side door is not closed, in this particularly simple variant, the last stored memory value $\alpha_0$ is determined in a step S9' as the current maximum allowed opening angle $\alpha_{max}$.

Then, in a step S11, a verification is made to determine whether a user is initiating the opening of the rear side door, for example by operating a door handle or a remote control. If this is the case, the door drive of the rear side door is controlled in a step S12 in such a way that when the door is opened, the current maximum allowed opening angle $\alpha_{max}$ is not exceeded. Then the process ends in step S13.

However, if it was determined in step S11 that no opening of the rear side door is currently desired, the method returns to step S3.

The embodiment variant of the method shown in FIG. 8 differs from the method according to FIG. 7 only in that, if it was determined in step S4 that the front side door is currently not closed, or is not sufficiently closed, the additional obstacle sensor is queried in a step S8 to determine, in a step S9, a maximum allowed opening angle based on the monitoring by the additional obstacle sensor. The lesser value from the maximum allowed opening angle determined with the additional obstacle sensor and the last stored memory value $\alpha_0$ is then determined in a step S10 as the current maximum allowed opening angle for the rear side door, before the method proceeds to step S11.

It should be additionally noted that, in both methods, in step S6 the current maximum allowed opening angle $\beta_{max}$ for the front side door can also be determined on the basis of the output of the monitoring by the primary obstacle sensor, and relayed to a drive for the front side door, such that if a user wants to open the front side door, the opening angle for the front side door is correspondingly limited during automatic door opening.

Overall, the solution according to the invention enables reliable monitoring of the opening region of both side doors with a high level of accuracy and reliability, lower costs, and a significantly reduced influence on the design of the vehicle.

What is claimed is:

1. Method for contactless obstacle detection for a motor vehicle (10) having a front side door (12) and a rear side door (14), using a single primary obstacle sensor (16) provided on the motor vehicle, the primary obstacle sensor being configured to monitor an opening region (12o) of the front side door (12) and, at least as long as the front side door (12) is closed, also to monitor an opening region (14o) of the rear side door (14), the method comprising the steps of, performed repeatedly:

determining (S6, S9'; S6, S10) a current maximum allowed opening angle ($\alpha_{max}$) for the rear side door (14) based on an output of a monitoring of the opening region (14o) of the rear side door (14) by the primary obstacle sensor (16), and taking into account a current opening state of the front side door (12).

2. The method according to claim 1, wherein, if the front side door (12) is currently sufficiently closed, the current maximum allowed opening angle ($\alpha_{max}$) for the rear side door (14) is determined (S6) based on the output ($I_{ToF}$) of a current monitoring of the opening region (14o) of the rear side door (14) by the primary obstacle sensor (16), and wherein, if the front side door (12) is currently not sufficiently closed, the current maximum allowed opening angle ($\alpha_{max}$) for the rear side door (14) is determined (S9'; S10) based on the output of a previous monitoring of the opening region (14o) of the rear side door (14), by the primary obstacle sensor (16), wherein the front side door (12) was sufficiently closed during the previous monitoring, wherein the front side door is sufficiently closed if the opening angle of the front side door does not exceed a predetermined maximum angle or if the front side door is completely closed.

3. The method according to claim 2, wherein, if the front side door (12) is currently sufficiently closed, the output of the current monitoring of the opening region (14*o*) of the rear side door (14) by the primary obstacle sensor (16) is filed and stored (S7) in a memory unit (18).

4. The method according to claim 2, wherein at least if the front side door (12) is not sufficiently closed, the current maximum allowed opening angle ($\alpha_{max}$) for the rear side door (14) is also determined (S10) based on an output of a current monitoring of the opening region (14*o*) of the rear side door (14) by an additional obstacle sensor (20), wherein the additional sensor (20) is further designed to monitor the opening region (14*o*) of the rear side door (14) independently of the opening state of the front side door (12).

5. The method according to claim 1, further comprising the following step of:

determining a current maximum allowed opening angle ($\beta_{max}$) for the front side door (12) based on an output of a current monitoring of the opening region (12*o*) of the front side door (12) by the primary obstacle sensor (16).

6. Method for automatically opening doors in a motor vehicle (10) having a front (12) and a rear side door (14), the method comprising the steps of:

carrying out the method for contactless obstacle detection according to claim 1, then, when a user initiates an opening of the rear side door (14), automatically opening (S12) the rear side door (14), such that the determined current maximum allowed opening angle ($\alpha_{max}$) for the rear side door (14) is not exceeded.

7. System (11) for contactless obstacle detection for a motor vehicle (10) having a front side door (12) and a rear side door (14), the system comprising:

a front door sensor (22) which is designed to detect an opening state of the front side door (12), a primary obstacle sensor (16) which is provided on the motor vehicle (10) and is configured to monitor an opening region (12*o*) of the front side door (12), and at least as long as the front side door (12) is closed, to also monitor an opening region (14*o*) of the rear side door (14), a data processing unit (24) which is in communication with the front door sensor (22) and the primary obstacle sensor (16) and which is designed to determine a current maximum allowed opening angle ($\alpha_{max}$) for the rear side door (14) based on an output of a monitoring of the opening region (14*o*) of the rear side door (14) by the primary obstacle sensor (16), and taking into account a current opening state of the front side door (12), and a door drive (26) for the rear side door (14) which door drive is in communication with the data processing unit (24).

8. The system (11) according to claim 7, wherein the primary obstacle sensor (16) is provided on a side mirror (13), a hinge of the front side door (12), or a front fender (15) of the motor vehicle (10).

9. The system (11) according to claim 7, further comprising an additional obstacle sensor (20) which is configured to monitor at least the opening region (14*o*) of the rear side door (14) independently of the opening state of the front side door (12).

10. The system (11) according to claim 9, wherein the additional obstacle sensor (20) is a radar sensor or an ultrasonic sensor, and/or wherein the additional obstacle sensor (20) is provided in such a manner that it monitors the opening region (14*o*) of the rear side door (14) and the opening region (12*o*) of the front side door (12).

11. Motor vehicle (10) having a system (11) for contactless obstacle detection according to claim 7.

* * * * *